(No Model.)
G. DASEKING.
CENTRIFUGAL CREAMER.
No. 600,684. Patented Mar. 15, 1898.
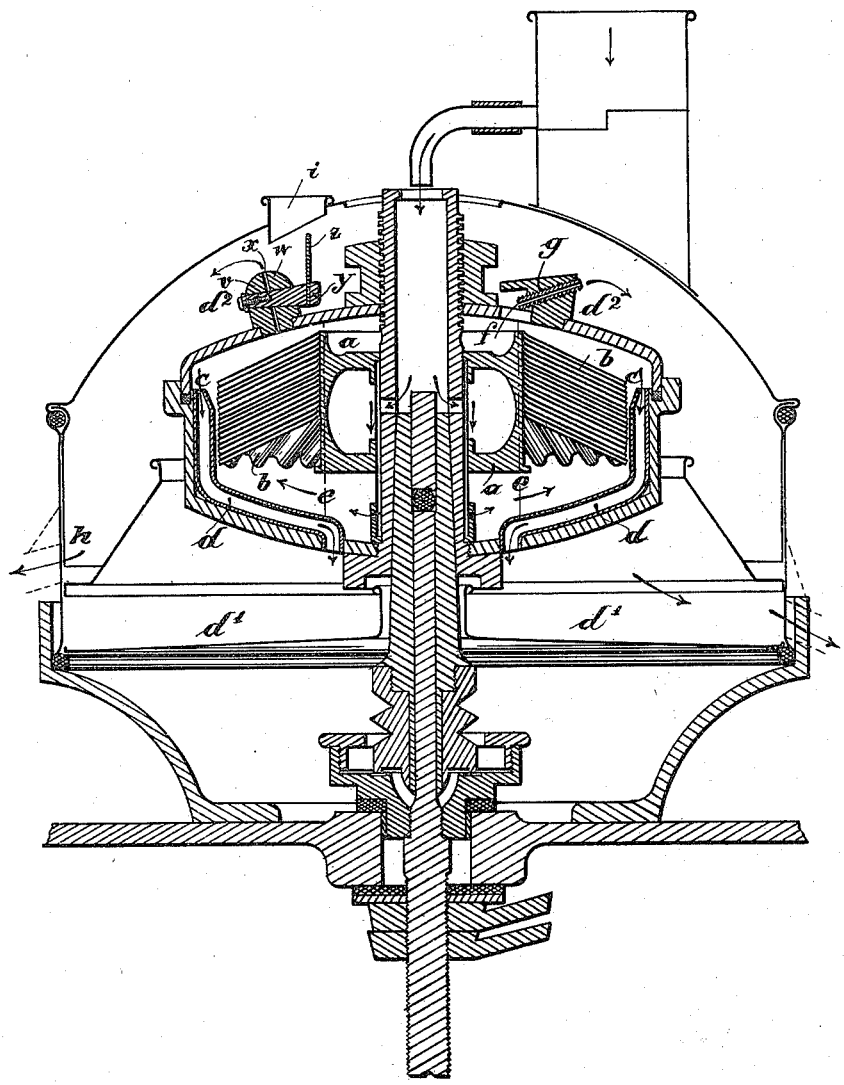

UNITED STATES PATENT OFFICE.

GEORG DASEKING, OF HANOVER, GERMANY.

CENTRIFUGAL CREAMER.

SPECIFICATION forming part of Letters Patent No. 600,684, dated March 15, 1898.

Application filed January 18, 1897. Serial No. 619,631. (No model.) Patented in Germany March 10, 1894, No. 22,920, and March 9, 1896, No. 53,757, and in Austria October 30, 1896, No. 46/4,379.

*To all whom it may concern:*

Be it known that I, GEORG DASEKING, a subject of the King of Prussia, Emperor of Germany, residing in Hanover, Germany, have invented certain new and useful Improvements in Centrifugal Milk-Separators, (for which I have obtained patents in Germany, No. 22,920, dated March 10, 1894, and No. 53,757, dated March 9, 1896, both being "Gebrauchmuster," and in Austria, No. 46/4,379, dated October 30, 1896,) of which the following is a specification.

This invention relates to improvements in centrifugal milk-separators, and comprises a device for separation of the milk and a device for securing directly the cream which hitherto has been obtainable only by running in a liquid free from fatty matter.

The accompanying drawing is a vertical section of an apparatus embodying my invention.

In the operation of this apparatus, while the centrifugal force is operative, the fluid is maintained in an upright position against the wall of the drum, thus enabling, in virtue of the centripetal force, as well as of the separating device which will be hereinafter described, the cream to be absolutely separated from the skim-milk particles in such a manner that the creamy layer is shoved along before the skim-milk particles, which pass close to the wall of the drum and enter at $c$ into the conduits or passages $d$ $d$, where they will be forced, following the direction of the arrows, toward the base of the stationary jacket $d'$, thereafter to be collected in a reservoir disposed there. The creamy particles, the outer limit of which during the separation is marked by broken line $e$, then enter at $f$ into the screw or outlet $g$, and thence flow off continuously into the head of the jacket $d^2$ and finally run away at $h$. As soon as the milk ceases being supplied, both of the separated fluids, cream and skim-milk, will cease to flow off, though there are still cream and skim-milk remaining in the drum, which if the drum were brought to rest would again unite with one another. In order to avoid this inconvenience and to get the creamy particles still remaining in the drum, other systems of operation make use of a fluid free from fat, which is run in and pushes out the cream in the usual way. This object is attained after a four or six fold quantity of fatless fluid has been supplied. Now to get out also these creamy particles, which till now were only to be secured by running in fatless fluid, in a better and quicker manner there is applied on the lid of the drum a valve $v$, which remains closed during the ordinary centrifugal operation. This valve is composed of a perforated seat $w$ and a channel $x$, the plug $y$ and the handle $z$, this latter passing close below the hole $i$ in the jacket. As soon as the rich milk ceases from flowing a solid object is to be put through the hole $i$. The handle then strikes against this latter object, and being turned over opens the valve. Then the cream runs through the channel $x$, in virtue of the centrifugal force acting within the drum, into the upper part of the jacket, thus readily furnishing the layer of cream otherwise obtainable only by filling up with fatless fluid.

The device $a$ consists of a number of plates $b$, each of them provided with radial indentations or radial undulations, and arranged one upon another in such a manner as to fit to one another as much as possible, the raised and the depressed portions corresponding. This arrangement prevents the milk from directly flowing over each one of the plates and forces it to take an undulatory path, in doing which the inertia of the milk must be overcome, the milk being thus forced continually along, separated, and divided into minute particles. These plates may be conical or rectilineally shaped, and their grooves may run like parallel chords or else like converging radii.

Thus this device in dividing the milk into minute particles separates the cream from the skim-milk in an extremely rapid and intensive manner.

Having thus described my invention, what I claim as new, and desire to secure by Letters Patent, is—

In a centrifugal milk-separator, a rotating drum, having an outlet in its top for the discharge of the cream, and a conduit at the side for the discharge of skim-milk, in combination with a valve located in the top of said drum at a point more remote from the center of the drum than the cream-outlet, but not so remote as the entrace to the conduit for the milk, said valve having a handle whereby it may be opened while the drum is in rotation in order to allow the cream to be forced out through said valve.

In testimony whereof I have signed my name to this specification in the presence of two subscribing witnesses.

GEORG DASEKING.

Witnesses:
EDUARD UNVERZAGH,
C. Y. FONDA.